Patented June 24, 1941

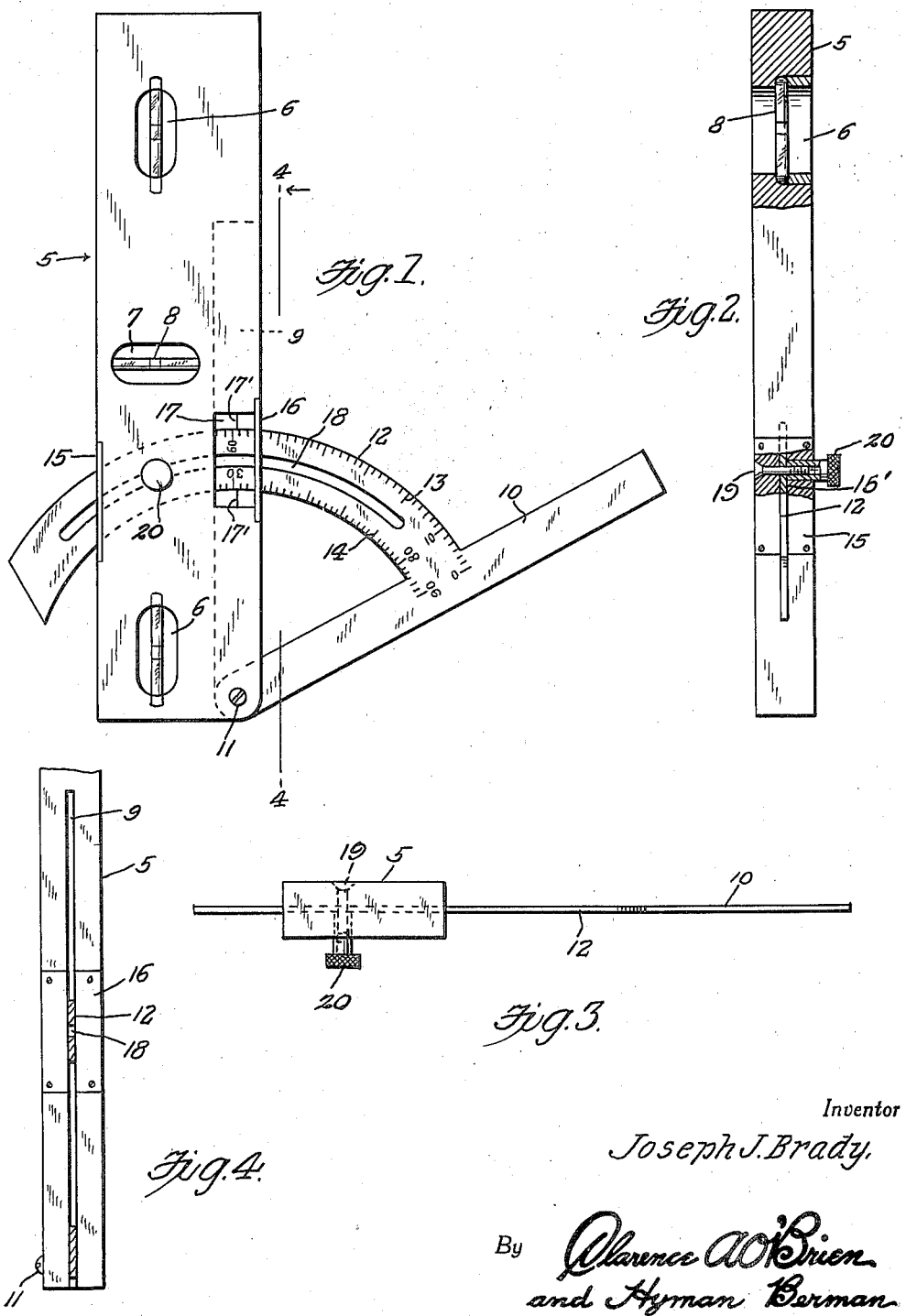

2,247,327

UNITED STATES PATENT OFFICE 2,247,327

COMBINATION TOOL

Joseph J. Brady, Galveston, Tex.

Application March 15, 1940, Serial No. 324,191

1 Claim. (Cl. 33—75)

This invention relates to a combination tool, and has for the primary object the provision of a device of this character which provides in a single unit a combined level, square and protractor which will permit carpenters, bricklayers, machinists and other persons having need for such a device to accurately and quickly carry out various types of operations falling under that class of work, such as ascertaining when certain work is level or plumb or for marking work with a square or for calculating and marking work with a selected bevel.

With these and other objects in view, the invention consists in certain novel features of construction, combination and arrangement of parts to be hereinafter more fully described and clamed.

For a complete understanding of my invention, reference is to be had to the following description and accompanying drawing, in which—

Figure 1 is a plan view illustrating a combination tool constructed in accordance with my invention.

Figure 2 is an edge elevation partly in section illustrating the same.

Figure 3 is an end elevation illustrating the tool.

Figure 4 is a sectional view taken on the line 4—4 of Figure 1.

Referring in detail to the drawing, the numeral 5 indicates an elongated body which goes to make up a portion of a level and has formed therein end slots 6 and an intermediate slot 7. The end slots 6 extend longitudinally of the body 5 while the intermediate slot 7 extends transversely of the body. Said slots provide sight openings so that spirit bubble tubes 8 mounted in said slots may be easily read from either side of the body, it being understood that the spirit bubble tubes in the slots 6 are utilized in ascertaining when work is level while the spirit bubble tube in the slot 7 is employed when ascertaining if work is plumb.

The body 5 along one edge thereof is provided with a groove 9 to receive an arm 10 of elongated flat formation and one end of said arm is detachably and pivotally mounted in the groove, as shown at 11, so that the arm may be swung into and out of the groove and when positioned at right angles to the body will coact therewith in forming a square.

A segmental shaped arm 12 has one end formed integral with one edge of the arm and substantially intermediate the ends of said arm 10. The arm 12 has arranged along its edges scales 13 and 14 each reading from zero to ninety. The scale readings are reversely arranged on the arm 12 to each other and in most instances it is desirable that the readings of the scale extend from zero to ninety designating degrees as clearly shown in Figure 1 of the drawing. Also, it is to be understood that the scale readings are duplicated on each side of the arm 12.

The body 5 is provided with a slot 15' of arcuate shape to slidably receive the arm 12. This slot communicates with the groove 9 and arranged at one end of the slot are wear plates 15 and arranged partly over the groove 9 are spaced wear plates 16 that align with the slot of the body and between which operates the arm 12. The wear plates 16 by straddling the arm 12 act to guide the movement of the arm 12 in relation to the body 5. Sight recesses 17 which communicate with the groove 9 are formed in opposite sides of the body so that the scales of the arm 12 may be read from each side of the body 5 and to permit the readings to be accurately carried out line markings 17' are provided in the sight recesses to be read in conjunction with the scales on the arm 12.

The arm 12 has an arcuate slot 18 and the body 5 carries a set bolt 19 which extends through the slot 18 and receives thereon a nut 20. The opening which receives the set bolt in the body has a portion thereof enlarged to permit the nut 20 to extend into engagement with the arm 12 for clamping the latter in its adjusted positions.

The body 5 and arms 10 and 12 with the scales on the arm 12 coact in forming a protractor in which the arm 10 can be set at various angles with respect to the body 5 and then used for determining a bevel of a desired degree and also for making markings on work in the cutting or otherwise making of a bevel in the work.

The arm 10 may be readily removed from the body 5 when desiring to use the latter as an ordinary plumb level.

It is believed that the foregoing description, when taken in connection with the drawing, will fully set forth the construction and advantages of this invention to those skilled in the art to which such a device relates, so that further detailed description will not be required.

Having thus described the invention, what I claim is:

In a measuring tool of the character described, an elongated body having a groove in one edge thereof, an elongated arm having one end pivoted in one end of said groove and movable into and out of the groove to assume angularly related positions with respect to the body, said body having an arcuate slot and recesses communicating with said slot at one end thereof and arranged in opposite faces of the body, an arcuately curved arm formed on the first-named arm and extending through the slot and having scale markings on opposite faces thereof to coact with the first arm and the body and providing a protractor readable through said recesses, spaced wear plates mounted on opposite edges of said body and located at opposite ends of the slot and having the second-named arm slidable therebetween, said second-named arm having an arcuately curved slot, and a fastener carried by the body and extending through the slot of the second-named arm for locking said arms in various positions with respect to the body.

JOSEPH J. BRADY.